United States Patent
Xu et al.

(10) Patent No.: US 10,979,360 B2
(45) Date of Patent: Apr. 13, 2021

(54) RESOURCE OBTAINING METHOD AND APPARATUS

(71) Applicant: Huawei Technologies Co., Ltd., Shenzhen (CN)

(72) Inventors: Weiping Xu, Shenzhen (CN); Shucheng Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 25 days.

(21) Appl. No.: 15/958,162

(22) Filed: Apr. 20, 2018

(65) Prior Publication Data

US 2018/0241689 A1 Aug. 23, 2018

Related U.S. Application Data

(63) Continuation of application No. PCT/CN2016/102599, filed on Oct. 19, 2016.

(30) Foreign Application Priority Data

Oct. 23, 2015 (CN) .......................... 2015 1 0697563

(51) Int. Cl.
*G06F 15/173* (2006.01)
*H04L 12/911* (2013.01)
(Continued)

(52) U.S. Cl.
CPC .......... *H04L 47/70* (2013.01); *H04L 41/0803* (2013.01); *H04L 61/2015* (2013.01);
(Continued)

(58) Field of Classification Search
CPC ................................. H04L 47/70; H04L 67/42
(Continued)

(56) References Cited

U.S. PATENT DOCUMENTS

| 6,449,267 | B1* | 9/2002 | Connors | ............ | H04B 7/18582 |
| | | | | | 370/321 |
| 7,644,410 | B1* | 1/2010 | Graupner | .............. | G06F 9/5011 |
| | | | | | 709/223 |

(Continued)

FOREIGN PATENT DOCUMENTS

| CN | 102664971 A | 9/2012 |
| CN | 103780483 A | 5/2014 |

(Continued)

*Primary Examiner* — Suraj M Joshi
*Assistant Examiner* — Ayele F Woldemariam
(74) *Attorney, Agent, or Firm* — Leydig, Voit & Mayer, Ltd.

(57) ABSTRACT

Embodiments of this application provide a resource obtaining method. A server side obtains a resource request that includes information about a resource requested by the server side. The server side sends the resource request to a client. After receiving the resource request, the client obtains, according to the information about the resource requested by the server side, information about a resource allocated to the server side. The client sends, to the server side, a resource response that includes the information about the resource allocated to the server side. In the method provided in the embodiments of this application, the server side actively sends, to the client, the resource request used to request the resource, and the resource that is allocated by the client to the server side according to the resource request of the server side can better meet an actual requirement of the server side.

11 Claims, 5 Drawing Sheets

(51) Int. Cl.
  *H04L 29/12* (2006.01)
  *H04L 12/24* (2006.01)
  *H04L 29/06* (2006.01)
(52) U.S. Cl.
  CPC .......... *H04L 61/2061* (2013.01); *H04L 67/42* (2013.01); *H04L 41/0213* (2013.01)
(58) Field of Classification Search
  USPC ........................................................ 709/226
  See application file for complete search history.

(56) References Cited

U.S. PATENT DOCUMENTS

| | | | |
|---|---|---|---|
| 8,335,171 | B1 | 12/2012 | Purkayastha et al. |
| 2002/0010767 | A1 | 1/2002 | Farrow et al. |
| 2003/0145119 | A1 | 7/2003 | Bender et al. |
| 2004/0215602 | A1* | 10/2004 | Cioccarelli ........... G06F 16/958 |
| 2005/0114492 | A1 | 5/2005 | Arberg et al. |
| 2010/0082779 | A1 | 4/2010 | Min |
| 2010/0191839 | A1* | 7/2010 | Gandhewar ....... H04L 29/12028 709/220 |
| 2011/0078014 | A1* | 3/2011 | Feldman ................ G06Q 30/02 705/14.42 |
| 2013/0042007 | A1* | 2/2013 | Linton ................... G06Q 10/10 709/226 |
| 2013/0091283 | A1* | 4/2013 | Omar .................. H04L 41/0896 709/226 |
| 2014/0365621 | A1 | 12/2014 | Vieira |
| 2015/0281947 | A1 | 10/2015 | Patil et al. |

FOREIGN PATENT DOCUMENTS

| | | |
|---|---|---|
| EP | 2913977 A2 | 9/2015 |
| JP | 2002525973 A | 8/2002 |
| WO | 2015014195 A1 | 2/2015 |

\* cited by examiner

RESOURCE OBTAINING METHOD AND APPARATUS

CROSS-REFERENCE TO RELATED APPLICATIONS

This application is a continuation of International Application No. PCT/CN2016/102599, filed on Oct. 19, 2016, which claims priority to Chinese Patent Application No. 2015/10697563.5, filed on Oct. 23, 2015. The disclosures of the aforementioned applications are hereby incorporated by reference in their entireties.

TECHNICAL FIELD

This application relates to the communications field, and in particular, to a resource obtaining method, an apparatus used as a server side, and an apparatus used as a client.

BACKGROUND

A NETCONF protocol is a new network configuration protocol launched by a NETCONF working group of the Internet Engineering Task Force (IETF). A function of the NETCONF in network management is similar to a Simple Network Management Protocol (SNMP), and is used for interface interaction and data transmission between a network manager and a device. In a network environment, a resource manager is configured to manage a plurality of resources of a network device together, such as an Internet Protocol (IP) address pool and a forwarding entry. The NETCONF protocol is used between the resource manager and the network device, and the resource manager may allocate a resource to the network device based on the NETCONF protocol. In a current resource allocation manner, a resource waste problem exists.

SUMMARY

This application provides a resource obtaining method, an apparatus used as a server side, and an apparatus used as a client, so as to help save resources.

To achieve the foregoing objective, this application provides the following technical solutions:

A first aspect of this application provides a resource obtaining method, including: obtaining, by a server side, a resource request that includes information about a resource requested by the server side, and sending the resource request to a client; and receiving, by the server side, a resource response that is sent by the client and that includes information about a resource allocated to the server side.

A second aspect of this application provides another resource obtaining method, including: receiving, by a client, a resource request that is sent by a server side and that includes information about a resource requested by the server side, and obtaining, according to the information that is about the resource requested by the server side and that is included in the resource request, information about a resource allocated to the server side; and sending, by the client to the server side, a resource response that includes the information about the resource allocated to the server side.

It can be learned from the foregoing two aspects that, in the resource obtaining method provided in embodiments of this application, the server side obtains the resource request that includes the information about the resource requested by the server side. The server side sends the resource request to the client. After receiving the resource request, the client obtains, according to the information about the resource requested by the server side, the information about the resource allocated to the server side. The client sends, to the server side, the resource response that includes the information about the resource allocated to the server side. In the method provided in embodiments of this application, the server side actively sends, to the client, the resource request used to request the resource, and the resource that is allocated by the client to the server side according to the resource request of the server side can better meet an actual requirement of the server side, thereby helping reduce a resource waste possibility.

In an implementation of the first aspect, before the obtaining, by a server side, a resource request, the method further includes: determining, by the server side, whether a resource used by the server side meets a condition, where the condition is used to represent resource usage of the server side. Based on this implementation, the server side obtains the resource request in the following specific implementation: when determining that the resource used by the server side meets the condition, generating, by the server side, the resource request according to the resource used by the server side and the condition.

The server side sends the resource request according to resource usage, and therefore the requested resource meets a requirement of the server side, thereby further reducing a resource waste.

In another implementation of the first aspect, the method further includes: when determining that communication between the server side and an active client is normal, selecting, by the server side, the active client as the client.

In another implementation of the first aspect, the method further includes: when determining that communication between the server side and an active client is abnormal, selecting, by the server side, a standby client as the client according to a correspondence and the active client, where the correspondence includes information about the active client and information about the standby client.

It can be learned that when there are both the active client and the standby client, the server side sends a resource request to only one client, so that transmission resources can be reduced.

A third aspect of this application provides an apparatus used as a server side, including:

an obtaining module, configured to obtain a resource request, where the resource request includes information about a resource requested by the apparatus used as a server side;

a sending module, configured to send the resource request to an apparatus used as a client; and a receiving module, configured to receive a resource response sent by the apparatus used as a client, where the resource response includes information about a resource allocated to the apparatus used as a server side.

The apparatus used as a server side and provided in the third aspect actively sends the resource request to the apparatus used as a client, thereby helping reduce a resource waste possibility.

Optionally, in an implementation of the third aspect, the apparatus further includes: a determining module, configured to determine whether a resource that is used by the apparatus used as a server side meets a condition, where the condition is used to represent resource usage of the apparatus used as a server side.

Optionally, based on the foregoing implementation of the third aspect, the first obtaining module obtains the resource request in the following specific implementation: when determining that the resource that is used by the apparatus used as a server side meets the condition, generating the resource request according to the resource that is used by the apparatus used as a server side and the condition.

In another implementation of the third aspect, the apparatus further includes: a first selection module, configured to: before the first sending module sends the resource request to the apparatus used as a client, when determining that communication between the apparatus used as a server side and an active apparatus used as a client is normal, select the active apparatus used as a client as the apparatus used as a client.

In another implementation of the third aspect, the apparatus further includes: a second selection module, configured to: before the first sending module sends the resource request to the apparatus used as a client, when determining that communication between the apparatus used as a server side and an active apparatus used as a client is abnormal, select, according to a correspondence and the active apparatus used as a client, a standby apparatus used as a client as the apparatus used as a client, where the correspondence includes information about the active apparatus used as a client and information about the standby apparatus used as a client.

A fourth aspect of this application provides an apparatus used as a client, including:

a receiving module, configured to receive a resource request sent by an apparatus used as a server side, where the resource request includes information about a resource requested by the apparatus used as a server side;

an obtaining module, configured to obtain, according to the information that is about the resource requested by the apparatus used as a server side and that is included in the resource request, information about a resource allocated to the apparatus used as a server side;

and a sending module, configured to send a resource response to the apparatus used as a server side, where the resource response includes the information about the resource allocated to the apparatus used as a server side.

A fifth aspect of this application provides an apparatus used as a server side, including a processor, a memory that is used together with the processor, and a communications interface. The memory stores a program that implements a resource obtaining function, and the processor implements the following functions by invoking the program in the memory and the communications interface: obtaining a resource request, where the resource request includes information about a resource requested by the apparatus used as a server side; sending the resource request to an apparatus used as a client; and receiving a resource response sent by the apparatus used as a client, where the resource response includes information about a resource allocated to the apparatus used as a server side.

A sixth aspect of this application provides an apparatus used as a client, including a processor, a memory that is used together with the processor, and a communications interface. The memory stores a program that implements a resource obtaining function, and the processor implements the following functions by invoking the program in the memory and the communications interface: receiving a resource request sent by an apparatus used as a server side, where the resource request includes information about a resource requested by the apparatus used as a server side; obtaining, according to the information that is about the resource requested by the apparatus used as a server side and that is included in the resource request, information about a resource allocated to the apparatus used as a server side; and sending a resource response to the apparatus used as a server side, where the resource response includes the information about the resource allocated to the apparatus used as a server side.

In some implementations of the first, the second, the third, the fourth, the fifth, and the sixth aspects of this application, the resource request includes a notification notification message that is based on a network configuration NETCONF protocol, and the notification message includes the information about the resource requested by the server side; and the resource response includes a remote procedure call (RPC) message that is based on the NETCONF protocol, and the RPC message includes the information about the resource allocated to the server side.

In some implementations of the first, the second, the third, the fourth, the fifth, and the sixth aspects of this application, the resource request includes a notification message that is based on a RESTCONF protocol, and the notification message includes the information about the resource requested by the server side; and the resource response includes a post post message that is based on the RESTCONF protocol, and the post message includes the information about the resource allocated to the server side.

In some implementations of the first, the second, the third, the fourth, the fifth, and the sixth aspects of this application, the resource request includes an obtaining message, and the obtaining message includes the information about the resource requested by the server side; and the resource response includes a response message, the response message includes the information about the resource allocated to the server side, and the response message is used to respond to the obtaining message.

In some implementations of the first, the second, the third, the fourth, the fifth, and the sixth aspects of this application, the information about the resource requested by the server side includes a first action type and a parameter of the resource requested by the server side, and the first action type is used to represent an operation performed on the resource requested by the server side; and the information about the resource allocated to the server side includes a second action type and a parameter of the resource allocated to the server side, and the second action type is used to represent an operation performed on the resource allocated to the server side.

In some implementations of the first, the second, the third, the fourth, the fifth, and the sixth aspects of this application, the information about the resource requested by the server side includes a first action type, a first identifier, and a parameter of the resource requested by the server side, the first action type is used to represent an operation performed on the resource requested by the server side, and the first identifier is used to represent order of the resource request; and the information about the resource allocated to the server side includes a second identifier and a parameter of the resource allocated to the server side, the second identifier is used to represent order of the resource response, and the second identifier is corresponding to the first identifier.

DESCRIPTION OF EMBODIMENTS

In a common resource configuration process, resource configuration may be performed, by using a NETCONF protocol, between a resource management device used as a client and a network device used as a server side. For example, in a scenario shown in FIG. 1, the resource management device used as a client sends an address range to the network device used as a server side, and the address range is an address range configured for the network device used as a server side for use. The network device creates an address pool according to the address range. The resource management device selects an address range according to manual setting. Therefore, to avoid processing capability insufficiency of the network device caused by a deviation that occurs when an address usage of the network device is estimated by means of manual setting, an address range allocated to the network device by means of manual setting is greater than an address range actually required by the network device, and consequently there are a large quantity of idle address resources on the network device, and a resource waste is caused because the large quantity of idle address resources on the network device cannot be used by another network device.

A method and an apparatus provided in embodiments of this application can help resolve a resource waste problem.

To make objectives, technical solutions, and advantages of embodiments of the present invention clearer, the following clearly describes technical solutions in embodiments of the present invention with reference to the accompanying drawings. The described embodiments are exemplary embodiments of the present invention.

In the method provided in embodiments of this application, a server side obtains a resource request, and the resource request includes an address of a client and information about a resource requested by the server side. The server side sends the resource request to the client according to the address of the client. The client receives the resource request sent by the server side. The client obtains, according to the information that is about the resource requested by the server side and that is included in the resource request, information about a resource allocated to the server side. The client sends a resource response to the server side, and the resource response includes the information about the resource allocated to the server side. The server side receives the resource response sent by the client. In this way, the server side can obtain, according to the information that is about the resource allocated to the server side and that is included in the resource response, a resource required by the server side, so as to help reduce a resource waste.

Figure 1:
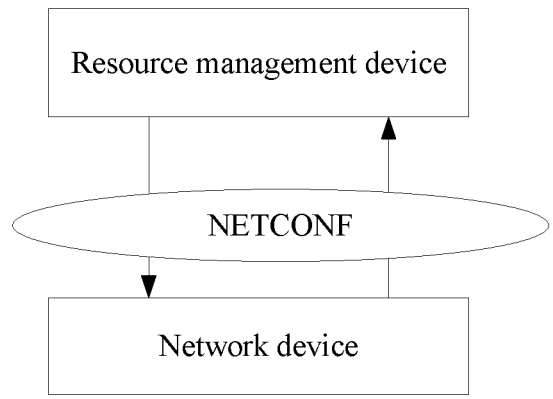
FIG. 1 is a schematic diagram in which a client and a server side perform resource configuration by using a NETCONF protocol.

The method and the apparatus provided in embodiments of this application may be applied to the scenario shown in FIG. 1. A server side mentioned in embodiments of this application may be a network device in FIG. 1. Alternatively, the server side mentioned in embodiments of this application may be an apparatus defined as a server side in a protocol that implements a configuration function, such as a router, a switch, a server, a virtualized network function (VNF), or a management system of the VNF. The management system of the VNF includes a VNF manager (VNFM) and a network functions virtualization (NFV) orchestrator (NFVO). The protocol that implements a configuration function may be a protocol such as a NETCONF protocol or a RESTCONF protocol. All protocols included in the protocol that implements a configuration function are not illustrated one by one herein. A client mentioned in embodiments of this application may be a resource management device in FIG. 1. Alternatively, the client mentioned in embodiments of this application may be an apparatus defined as a client in the protocol that implements a configuration function, such as a router, a switch, a server, or a controller. Both an apparatus used as the client and the apparatus used as the server side support the protocol that implements a configuration function.

Figure 2:
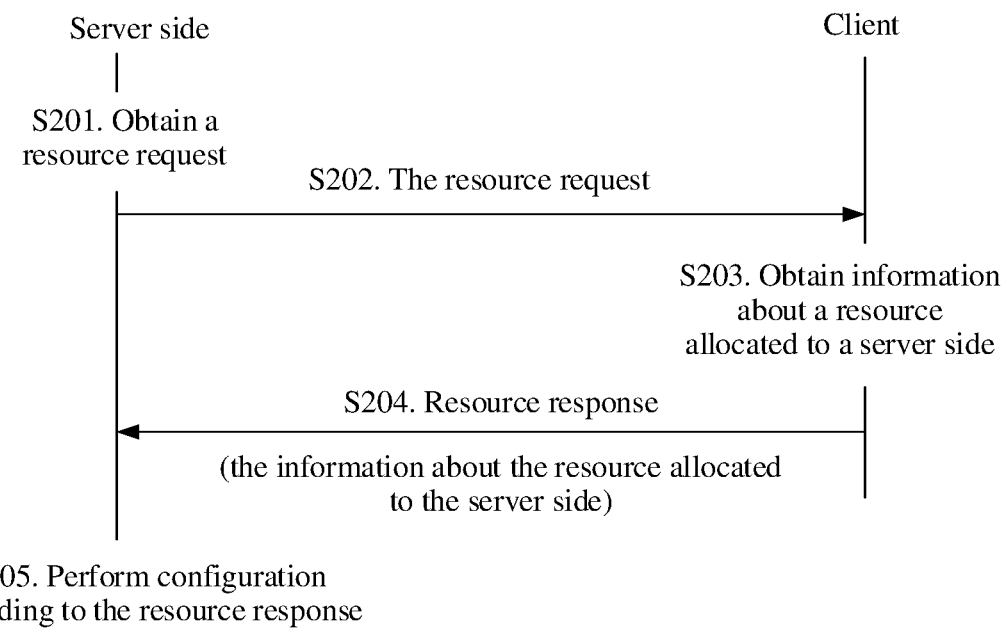
FIG. 2 is a flowchart of a resource obtaining method according to an embodiment of this application.

A session may be set up between the server side and the client by using the protocol that implements a configuration function, for example, a NETCONF session may be set up between the server side and the client by using a NETCONF protocol, or a RESTCONF session may be set up between the server side and the client by using a RESTCONF protocol. A method for obtaining a resource from the client by the server side is described below with reference to the scenario in FIG. 1. As shown in FIG. 2, the resource obtaining method provided in this embodiment of this application includes the following steps.

S201. The server side obtains a resource request, where the resource request includes information about a resource requested by the server side.

For example, the resource requested by the server side may be a resource required by the server side to complete a service, or may be a resource required for configuring another device. For example, the server side is a broadband network gateway (BNG). If the BNG needs to complete a service of allocating an address to a user, the BNG needs to obtain an address pool and a forwarding entry in advance, that is, a resource requested by the BNG includes the address pool and the forwarding entry.

Specifically, the information about the resource requested by the server side includes a first action type and a parameter of the resource requested by the server side. The parameter of the resource requested by the server side is a necessary parameter included in a resource required by the server side to complete a service. For example, if the server side needs to complete an address allocation service, a resource required by the server side to complete the address allocation service is an address pool, and the parameter of the resource requested by the server side is a parameter related to the address pool. The first action type is used to represent an operation performed on the resource requested by the server side. If the parameter of the resource requested by the server side is a parameter related to the address pool, the first action type may be "request", "release", or "lease renewal".

For example, content included in the parameter of the resource requested by the server side varies with different content of the first action type. For example, the resource requested by the server side is an address pool, and the first action type is "request". The parameter of the resource requested by the server side includes a type of the address pool. Optionally, the parameter of the resource requested by the server side may further include a quantity of addresses included in the address pool. The type of the address pool may be IPv4 or IPv6.

For example, the resource requested by the server side is an address pool, and the first action type is "lease renewal". The parameter of the resource requested by the server side includes a name of the address pool. After receiving an action of lease renewal, a client may extend, according to a specified validity period, the address pool sent by the server side to the validity period. Optionally, the parameter of the resource requested by the server side may further include the validity period.

For example, the resource requested by the server side is an address pool, and the first action type is "release". The parameter of the resource requested by the server side includes a name of the address pool. Optionally, the parameter of the resource requested by the server side may further include an address range of the address pool. The address range of the address pool may be a subset of an address pool requested by the server side, or may be an address pool requested by the server side.

The "request" is an action of requesting, by the server side, an available address pool from the client when the server side has no sufficient address resource pools. The "release renewal" is an action of applying for a validity period again before the address pool requested by the server side reaches a valid time. The validity period may be an end time such as Dec. 20, 2050, or may be a period of time such as two days. The "release" is an action of allocating, by the client, an address pool not used by the server side in a period of time to another server side. It should be noted that the address pool in this embodiment is a segment of address, for example, an IPv4 address segment 100.100.0.1 to 100.100.0.254 is an address pool that includes 254 address resources.

Optionally, the resource request may further include an identifier of the resource request, and the identifier of the resource request is used to represent a sequence number of the resource request. If the server side sends a plurality of resource requests to the client, identifiers of the resource requests may be used to distinguish between the plurality of resource requests. In this embodiment of this application, the identifier of the resource request may be at least one of a letter or a number, such as 100, Second, and Number 100.

S202. The server side sends the resource request to the client.

For example, at least one of an IP address or a media access control (MAC) address of the client may be configured on the server side. The server side may send the resource request to the client according to the IP address or the MAC address. Alternatively, an identifier of the client may be configured on the server side, and the server side may obtain at least one of the IP address or the MAC address of the client according to the identifier of the client. The server side may send the resource request to the client according to the IP address or the MAC address. Alternatively, a correspondence between an identifier of the client and a port may be configured on the server side, and the port is a port that can be used by the server side to communicate with the client. The server side may obtain, according to the identifier of the client, the port that can be used to communicate with the client. The server side may send the resource request to the client by using the port.

S203. After receiving the resource request, the client obtains, according to the information that is about the resource requested by the server side and that is included in the resource request, information about a resource allocated to the server side.

For example, the information about the resource allocated to the server side includes a second action type and a parameter of the resource allocated to the server side, and the second action type is used to represent an operation performed on the resource allocated to the server side.

For example, the resource requested by the server side is an address pool, and the first action type is "request". The parameter of the resource allocated to the server side includes a name of the address pool, a start address of the address pool, and an end address of the address pool, and the second action type is "create". Optionally, the parameter of the resource allocated to the server side may further include at least one of a validity period of the address pool or a type of the address pool. The type of the address pool may be IPv4 or IPv6. The "create" is an action of creating, by the server side according to the start address of the address pool and the end address of the address pool, an address pool named with a name of the address pool on the server side.

For example, the resource requested by the server side is an address pool, and the first action type is "lease renewal". The parameter of the resource allocated to the server side includes a name of the address pool and a validity period of the address pool, and the second action type is "update". The "update" is an action of continuing, by the server side, to use the address pool corresponding to the name of the address pool till the validity period of the address pool.

For example, the resource requested by the server side is an address pool, and the first action type is "release". The parameter of the resource allocated to the server side includes a name of the address pool, and the second action type is "delete". Optionally, the parameter of the resource requested by the server side may further include an address range of the address pool. The address range of the address pool may be a subset of an address pool requested by the server side, or may be an address pool requested by the server side. The "delete" is an action of giving up, by the server side, use of the address pool corresponding to the name of the address pool.

S204. The client sends a resource response to the server side, where the resource response includes the information about the resource allocated to the server side.

For example, the resource response is used to send the information about the allocated resource to a device that sends the resource request. The information that is about the resource allocated to the server side and that is in the resource response includes a second action type and a parameter of the resource allocated to the server side. The parameter of the resource allocated to the server side may include a resource name such as an address pool or a forwarding entry, and a resource parameter. The second action type is used to represent an operation performed on the resource allocated to the server side.

It can be learned that the second action type is corresponding to the first action type. The first action type and the second action type may be represented by using a same field, or may be represented by using different fields.

Optionally, the resource response may further carry an identifier of the resource response. The identifier of the resource response is used to represent a sequence number of the resource response, and is used to be distinguished from another resource response.

S205. The server side performs configuration according to the resource response.

For example, that the server side performs configuration according to the resource response includes: The server side configures a resource according to the second action type in the resource response and the parameter of the resource allocated to the server side, for example, creates an address pool, updates an address pool, or deletes an address pool. No examples are provided one by one herein for description.

In this embodiment provided in this application, the server side actively initiates the resource request. Both a resource request initiator and a resource user are the server side. Therefore, the server side can apply for a resource according to a requirement, so as to help avoid resource idleness, improve resource utilization, and reduce a resource waste.

Optionally, before S201, this embodiment provided in this application further includes: determining, by the server side, whether a resource used by the server side meets a condition, where the condition is used to represent resource usage of the server side. Correspondingly, that the server side obtains the resource request includes: when determining that the resource used by the server side meets the condition, generating, by the server side, the resource request according to the resource used by the server side and the condition.

It should be noted that the resource request and the resource response can each carry an identifier. Therefore, in addition to the foregoing specific implementation of the resource request and the resource response, the resource request and the resource response may optionally be in the following forms.

The resource request includes the information about the resource requested by the server side. Further, the information about the resource requested by the server side includes a first action type, a first identifier, and a parameter of the resource requested by the server side. The first action type is used to represent an operation performed on the resource requested by the server side. The first identifier is used to represent order of the resource request.

The resource response includes the information about the resource allocated to the server side. Further, the information about the resource allocated to the server side includes a second identifier and a parameter of the resource allocated to the server side. The second identifier is used to represent order of the resource response. The second identifier is corresponding to the first identifier.

That is, compared with that in the method in FIG. 2, the resource response may not include the second action type. After receiving the resource response, the server side may determine, according to the identifier in the resource response, the identifier in the resource request, and a correspondence between the identifier of the resource request and the identifier of the resource response, a resource request corresponding to the resource response, so as to perform a corresponding resource configuration operation according to a first action type in the resource request corresponding to the resource response.

Figure 3:
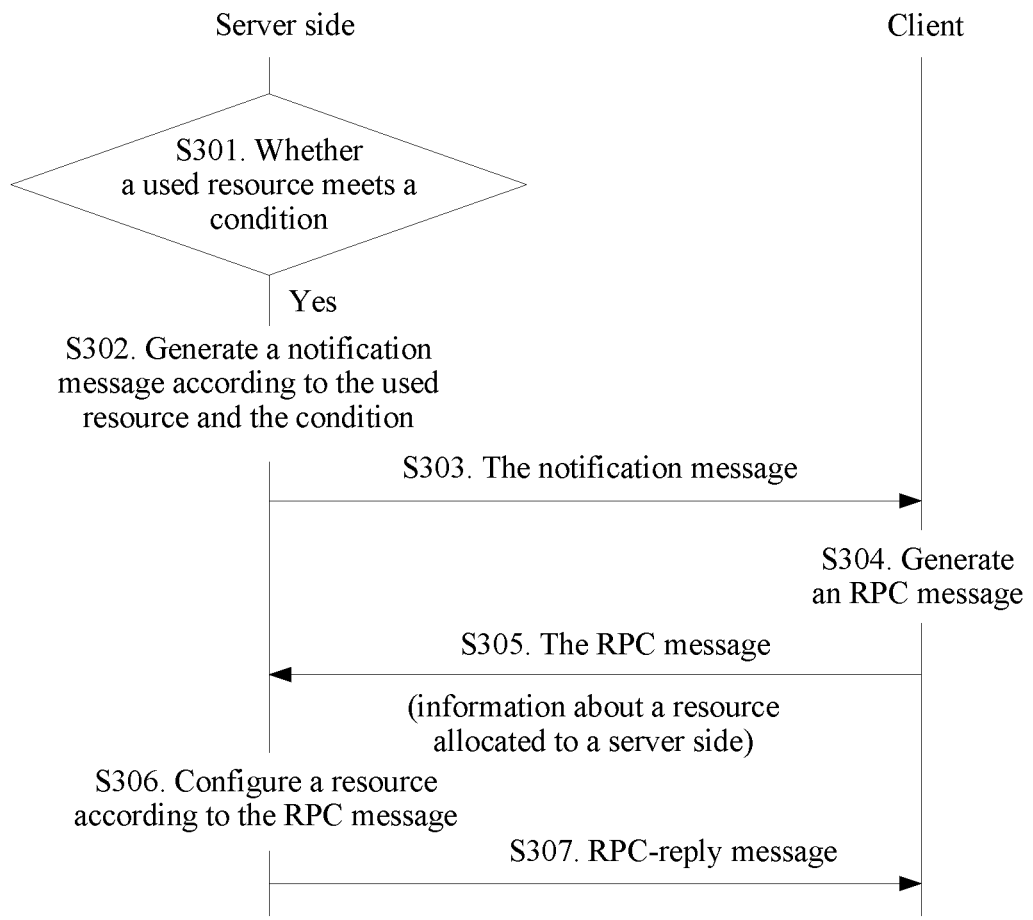
FIG. 3 is a flowchart of another resource obtaining method according to an embodiment of this application.

A NETCONF protocol is used as an example, and a specific process in which a server side and a client perform resource configuration may be shown in FIG. 3, and includes the following steps.

S301. The server side determines whether a resource used by the server side meets a condition, and if the resource used by the server side meets the condition, performs S302, or if the resource used by the server side does not meet the condition, may continue to monitor resource usage of the server side.

The condition is used to represent the resource usage of the server side. An address pool is used as an example. If the address pool includes 100 addresses, the condition is that a quantity of addresses used by the server side is greater than 90 and less than 100, and 91 addresses are used by the server side, the server side determines that the resources used by the server side meet the condition. The server side learns that an address pool that the service side has requested may be insufficient for use. The server side generates a resource request used to request a new address pool. If the condition is that a valid time of the address pool of the server side exceeds two days, after determining that the requested address pool meets the condition, the server side sends a resource request for lease renewal to the client. If the condition is that a quantity of addresses not in use is greater than 20 and less than 100, and 21 addresses are not used by the server side, the server side determines that resources used by the server side meet the condition. If the server side learns that an address can be released, the server side generates a resource request used to request address pool release.

S302. The server side generates a notification message according to the resource used by the server side and the condition.

Optionally, the server side may further send the resource used by the server side and the condition to another device, so that the another device can generate a resource request according to the used resource and the condition. The server side may receive the resource request sent by the another device.

For example, the notification message includes information about a resource requested by the server side. For a specific form of the information about the resource requested by the server side, refer to description in S201. Optionally, the information about the resource requested by the server side may be carried in a payload payload field of the notification message.

S303. The server side sends the notification message to a client.

The server side may send the notification message to the client based on stipulation in a NETCONF protocol. Details are not described herein.

S304. After receiving the notification message, the client generates a remote procedure call (RPC) message.

For example, the RPC message includes information about a resource allocated to the server side. For a specific form, refer to description in S203. Optionally, the information about the resource allocated to the server side may be carried in a payload payload field of the RPC message. The client may send the RPC message based on stipulation in the NETCONF protocol. Details are not described herein.

S305. The client sends the RPC message to the server side.

The client may send the RPC message to the server side based on stipulation in the NETCONF protocol. Details are not described herein.

In this embodiment, to ensure compatibility between the RPC message and an existing NETCONF protocol, in addition to the information about the resource allocated to server side, the RPC message further carries a protocol operation type. In this embodiment, the protocol operation type of the RPC message is edit-configuration.

S306. The server side configures a resource according to the RPC message.

In this embodiment, for content of the resource configuration, refer to corresponding content in the embodiment corresponding to FIG. 2. Details are not described herein again.

S307. The server side sends resource configuration feedback to the client.

In this embodiment, the resource configuration feedback may be a remote procedure call-reply (RPC-reply) message. The RPC-reply message is used to notify the client of a resource configuration result. The resource configuration result is a configuration success or a configuration failure.

In the method in this embodiment, a conventional notification message and RPC message are improved, so that the server side can request a resource from the client by using the improved notification message, and the client can deliver a resource to the server side by using the RPC message. Therefore, the server side actively requests a resource in a NETCONF protocol framework, so as to reduce a resource waste.

Examples of the notification message used for the resource request and the RPC message used for the resource response are as follows:

```
        <Notification request-message-id=201>   //a notification message, and an identifier
of the message is 201
            <event>
                <address-pool operation="GET"> //a resource name is an address pool, and a
first action type is "request" (it may be represented as "GET")
                    <address-number>254</address-number> //a quantity of requested addresses
is 254
            </event>
        </Notification>
        <RPC message-id=101>        //an RPC request message, and an identifier of the
message is 101
            <edit-config>
                <request-message-id>201</request-message-id>   //a  request  notification
corresponding to an identifier reply message
                <address-pool> //a resource name is an address pool
                    <address-pool-entry operation="create">  //a second action type is "create"
(create)
                        <name>First_pool</name> //a name of the address pool
                        <ip-lower-address>100.0.0.1</ip-lower-address>
                        <ip-upper-address>100.0.0.254</ip-lower-address>
                        <life-time>24H</life-time> //a valid time of the address pool is 24 hours
                    </address-pool-entry>
                </address-pool>
            </edit-config>
        </RPC>
        <RPC-REPLY message-id=101>      //an RPC reply message, and an identifier of
the message is 101
            <ok/>
        </RPC-REPLY>.
```

Similarly, in a RESTCONF protocol framework, the server side may add the information about the resource requested by the server side to a notification message that is based on a RESTCONF protocol, and send a resource request to the client. The client may add the information about the resource allocated to the server side to a post post message that is based on the RESTCONF protocol, and send a resource response to the server side. For specific content of the information about the resource requested by the server side and specific content of the information about the resource allocated to the server side, refer to the embodiment corresponding to FIG. 2 or FIG. 3.

Figure 4:
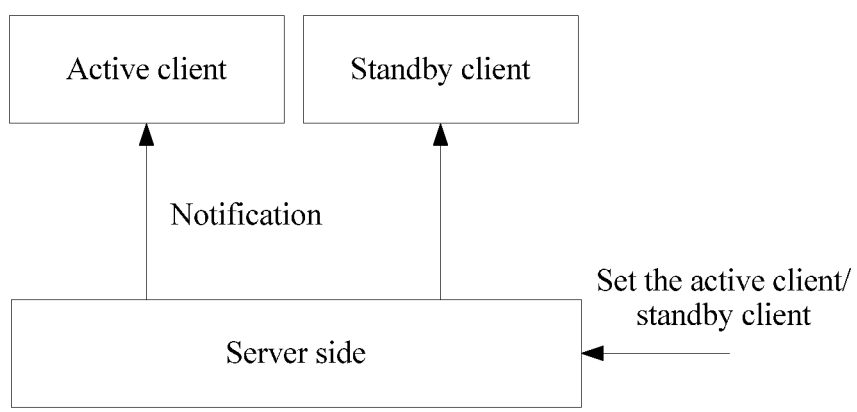
FIG. 4 is a schematic diagram in which an active client and a standby client communicate with a server side by using a NETCONF protocol.
Figure 5:
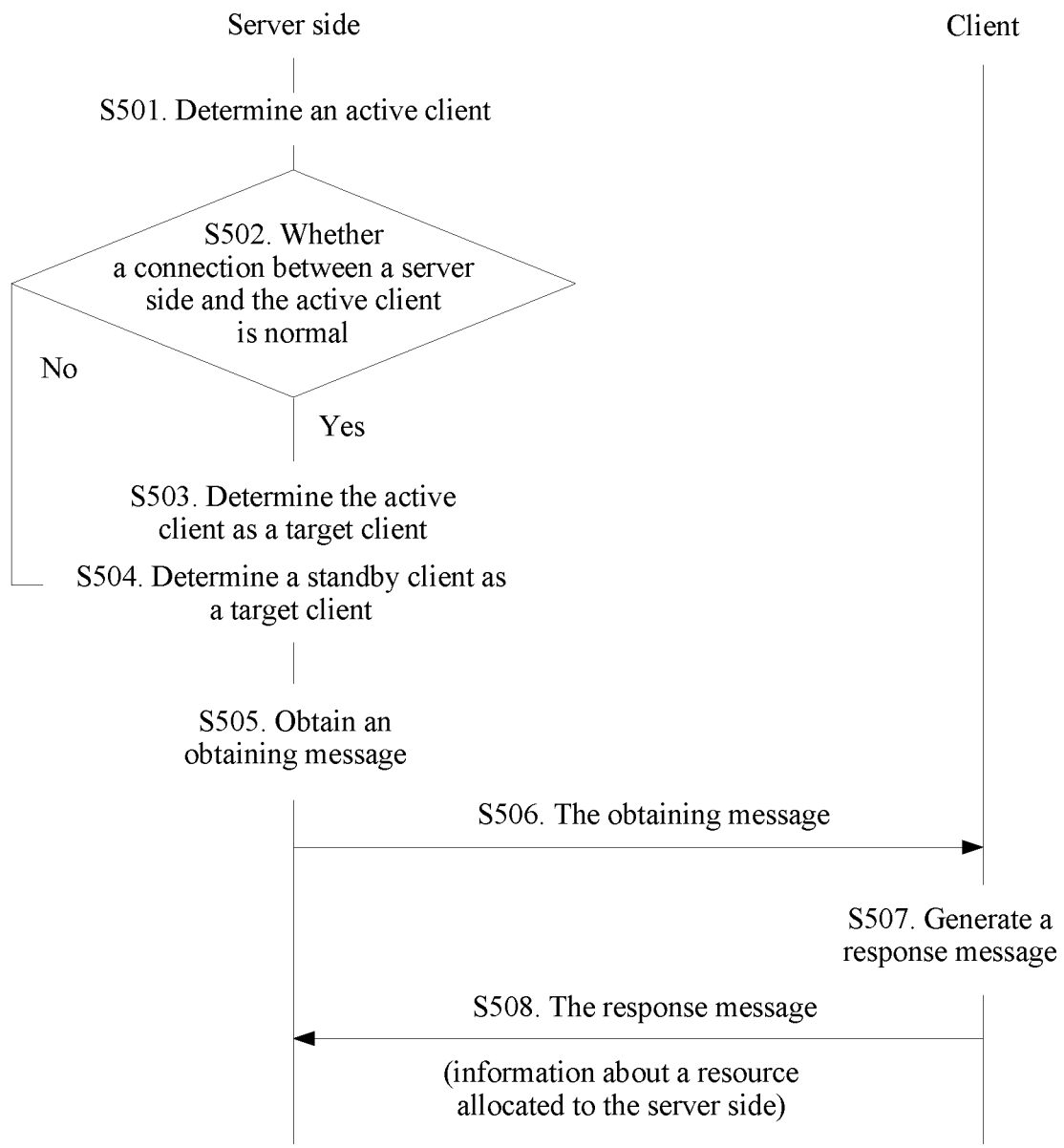
FIG. 5 is a flowchart of another resource obtaining method according to an embodiment of this application.

As shown in FIG. 4, in a resource management system, two clients are respectively set as an active client and a standby client. The active client and the standby client each set up a NETCONF session with the server side. In this scenario, a resource configuration process is shown in FIG. 5, and includes the following steps.

S501. The server side determines the active client by querying a list on a network management device.

For example, the list on the network management device includes an identifier of the active client and an identifier of the standby client. The list on the network management device may be a list configured on the server side, or may be a list configured in the resource management system. The server side may obtain the list on the network management device by interacting with the resource management system.

S502. The server side determines whether a connection between the server side and the active client is normal, and if the connection between the server side and the active client is normal, performs S503, or if the connection between the server side and the active client is abnormal, performs S504.

For example, a normal connection in this embodiment indicates that normal communication can be performed. The server side may determine, by using corresponding content in a NETCONF protocol, whether a connection between the server side and the standby client is normal. Details are not described herein.

S503. The server side determines the active client as a target client, and then performs S505.

For example, the server side selects the active client as the client mentioned in the embodiment corresponding to FIG. 2 or FIG. 3, that is, the target client.

S504. The server side determines a standby client of the active client as a target client according to a correspondence and the active client.

The correspondence includes information about the active client and information about the standby client. The correspondence may be stored in the list on the network management device, or may be stored on the server side in a form of another entry, and no examples are provided one by one herein for description.

For example, after determining that the connection between the server side and the standby client is normal, the server side selects the standby client as the client in the embodiment corresponding to FIG. 2 or FIG. 3, that is, the target client. A method used by the server side to determine whether the connection between the server side and the standby client is normal is the same as that in S502. Details are not described herein again.

S505. The server side obtains an obtaining message.

For example, the obtaining message may be a fetch message. The fetch message may be a message that is based on a NETCONF protocol, a RESTCONF protocol, or another protocol that implements a configuration function. The fetch message includes the information about the resource requested by the server side. For a specific form of the information about the resource requested by the server side, refer to S201.

S505 may be performed before S502 to S504, and order is not limited in this embodiment.

S506. The server side sends the obtaining message to the target client.

The server side may send the fetch message to the client based on stipulation in the NETCONF protocol. Details are not described herein.

S507. After receiving the obtaining message, the target client generates a response message.

For example, the response message may be a fetch reply message. The fetch reply message may be a message that is based on a NETCONF protocol, a RESTCONF protocol, or another protocol that implements a configuration function. The fetch reply message includes the information about the resource allocated to the server side. For a specific form, refer to description in S203.

S508. The target client sends a fetch reply message to the server side.

The target client may send the fetch reply message to the server side based on stipulation in the NETCONF protocol. Details are not described herein.

Examples of the fetch message and the fetch reply message in this embodiment are as follows:

In addition, in this embodiment, if there are the active client and the standby client, the server side sends a request message to only one client, so that transmission resources can be reduced.

An embodiment of this application further discloses an apparatus used as a server side and an apparatus used as a client. The apparatus used as a server side may implement steps performed by the "server side" in the method shown in FIG. 2, FIG. 3, or FIG. 5, and the apparatus used as a client may implement steps performed by the "client" in the method shown in FIG. 2, FIG. 3, or FIG. 5. The apparatus used as a server side may obtain, by using the method shown in FIG. 2, FIG. 3, or FIG. 5, a resource from the apparatus used as a client.

Figure 6:
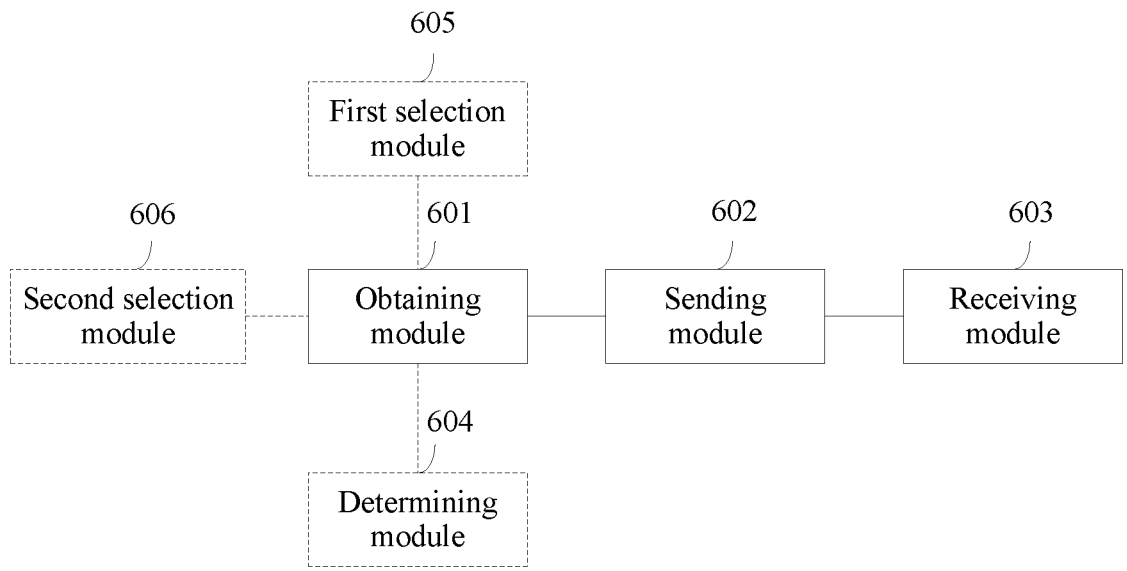
FIG. 6 is a schematic structural diagram of an apparatus used as a server side according to an embodiment of this application.

As shown in FIG. 6, an apparatus used as a server side includes an obtaining module 601, a sending module 602, and a receiving module 603.

The obtaining module 601 is configured to obtain a resource request, and the resource request includes an address of an apparatus used as a client and information about a resource requested by the apparatus used as a server side. The sending module 602 is configured to send, according to the address of the apparatus used as a client, the resource request to the apparatus used as a client. The receiving module 603 is configured to receive a resource response sent by the apparatus used as a client, and the resource response includes information about a resource allocated to the apparatus used as a server side.

Optionally, the apparatus shown in FIG. 6 may further include: a determining module 604, configured to determine whether a resource that is used by the apparatus used as a server side meets a condition, where the condition is used to represent resource usage of the apparatus used as a server side.

Optionally, if the determining module obtains a determining result, the obtaining module 601 obtains the resource request in the following specific implementation: when

```
        <fetch message-id=101>      // a fetch identifier request message, and an identifier
of the message is 101
        <data>
            <address-pool operation="GET"> //a resource name is an address pool, and
an action type is "request" (it may be represented as "GET")
                <address-number>254</address-number>      //a  quantity  of  requested
addresses is 254
            </address-pool>
        </data>
    </fetch>
        <fetch-reply  message-id=101>      // "fetch-reply" identifies a reply message
corresponding to the request message, and an identifier of the message is 101
        <data>
            <address-pool>  //a resource name is an address pool
                <address-pool-entry>
                    <name>First_pool</name> //a name of the address pool
                    <ip-lower-address>100.0.0.1</ip-lower-address>
                    <ip-upper-address>100.0.0.254</ip-lower-address>
                    <life-time>24H</life-time> //a valid time of the address pool is 24 hours
                </address-pool-entry>
            </address-pool>
        </data>
    </fetch-reply>.
```

It can be learned from the foregoing process that, in this embodiment, both the fetch message and the fetch-reply message are message types that are newly set in a framework of the NETCONF protocol, the RESTCONF protocol, or the another protocol that implements the configuration function, so as to perform a process of performing resource configuration between the server side and the client.

determining that the resource that is used by the apparatus used as a server side meets the condition, generating the resource request according to the resource that is used by the apparatus used as a server side and the condition.

Optionally, the apparatus shown in FIG. 6 may further include: a first selection module 605, configured to: before the first sending module sends the resource request to the apparatus used as a client, when determining that communication between the apparatus used as a server side and an active apparatus used as a client is normal, select the active apparatus used as a client as the apparatus used as a client.

Optionally, the apparatus shown in FIG. 6 may further include: a second selection module 606, configured to: before the first sending module sends the resource request to the apparatus used as a client, when determining that communication between the apparatus used as a server side and an active apparatus used as a client is abnormal, select, according to a correspondence and the active apparatus used as a client, a standby apparatus used as a client as the apparatus used as a client, where the correspondence includes information about the active apparatus used as a client and information about the standby apparatus used as a client.

Optionally, the resource request obtained by the obtaining module 601 is a notification notification message that is based on a network configuration NETCONF protocol, and the notification message includes the information about the resource requested by the apparatus used as a server side. The resource response received by the receiving module 603 includes a remote procedure call (RPC) message that is based on the NETCONF protocol, and the RPC message includes the information about the resource allocated to the apparatus used as a server side.

Alternatively, the resource request obtained by the obtaining module 601 is a notification message that is based on a RESTCONF protocol, and the notification message includes the information about the resource requested by the apparatus used as a server side. The resource response received by the receiving module 603 is a post post message that is based on the RESTCONF protocol, and the post message includes the information about the resource allocated to the apparatus used as a server side.

Alternatively, the resource request obtained by the obtaining module 601 is an obtaining message, and the obtaining message includes the information about the resource requested by the apparatus used as a server side. The resource response received by the receiving module 603 is a response message, the response message includes the information about the resource allocated to the apparatus used as a server side, and the response message is used to respond to the obtaining message.

Optionally, the information that is about the resource requested by the apparatus used as a server side and that is included in the resource request obtained by the obtaining module 601 includes a first action type and a parameter of the resource requested by the apparatus used as a server side, and the first action type is used to represent an operation performed on the resource requested by the apparatus used as a server side. The information that is about the resource allocated to the apparatus used as a server side and that is included in the resource response received by the receiving module 603 includes a second action type and a parameter of the resource allocated to the apparatus used as a server side, and the second action type is used to represent an operation performed on the resource allocated to the apparatus used as a server side.

Alternatively, the information that is about the resource requested by the apparatus used as a server side and that is included in the resource request obtained by the obtaining module 601 includes a first action type, a first identifier, and a parameter of the resource requested by the apparatus used as a server side, the first action type is used to represent an operation performed on the resource requested by the apparatus used as a server side, and the first identifier is used to represent order of the resource request. The information that is about the resource allocated to the apparatus used as a server side and that is included in the resource response received by the receiving module 603 includes a second identifier and a parameter of the resource allocated to the apparatus used as a server side, the second identifier is used to represent order of the resource response, and the second identifier is corresponding to the first identifier.

The apparatus used as a server side in this embodiment actively sends the resource request to the apparatus used as a client, to request resource configuration, thereby helping reduce a resource waste.

Figure 7:
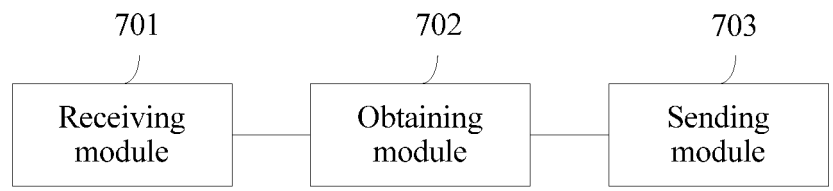
FIG. 7 is a schematic structural diagram of an apparatus used as a client according to an embodiment of this application.

As shown in FIG. 7, an apparatus used as a client includes a receiving module 701, an obtaining module 702, and a sending module 703.

The receiving module 701 is configured to receive a resource request sent by an apparatus used as a server side, and the resource request includes an address of the apparatus used as a client and information about a resource requested by the apparatus used as a server side. The obtaining module 702 is configured to obtain, according to the information that is about the resource requested by the apparatus used as a server side and that is included in the resource request, information about a resource allocated to the apparatus used as a server side. The sending module 703 is configured to send a resource response to the apparatus used as a server side, and the resource response includes the information about the resource allocated to the apparatus used as a server side.

Optionally, the resource request received by the receiving module 701 is a notification notification message that is based on a network configuration NETCONF protocol, and the notification message includes the information about the resource requested by the apparatus used as a server side. The resource response sent by the sending module 703 is a remote procedure call (RPC) message that is based on the NETCONF protocol, and the RPC message includes the information about the resource allocated to the apparatus used as a server side.

Alternatively, the resource request received by the receiving module 701 is a notification message that is based on a RESTCONF protocol, and the notification message includes the information about the resource requested by the apparatus used as a server side. The resource response sent by the sending module 703 is a post post message that is based on the RESTCONF protocol, and the post message includes the information about the resource allocated to the apparatus used as a server side.

Alternatively, the resource request received by the receiving module 701 is an obtaining message, and the obtaining message includes the information about the resource requested by the apparatus used as a server side. The resource response sent by the sending module 703 is a response message, the response message includes the information about the resource allocated to the apparatus used as a server side, and the response message is used to respond to the obtaining message.

Optionally, the information that is about the resource requested by the apparatus used as a server side and that is included in the resource request received by the receiving module 701 includes a first action type and a parameter of the resource requested by the apparatus used as a server side, and the first action type is used to represent an operation performed on the resource requested by the apparatus used as a server side. The information that is about the resource allocated to the apparatus used as a server side and that is obtained by the obtaining module 702 includes a second action type and a parameter of the resource allocated to the apparatus used as a server side, and the second action type is used to represent an operation performed on the resource allocated to the apparatus used as a server side.

Alternatively, the information that is about the resource requested by the apparatus used as a server side and that is included in the resource request received by the receiving module 701 includes a first action type, a first identifier, and a parameter of the resource requested by the apparatus used as a server side, the first action type is used to represent an operation performed on the resource requested by the apparatus used as a server side, and the first identifier is used to represent order of the resource request. The information that is about the resource allocated to the apparatus used as a server side and that is obtained by the obtaining module 702 includes a second identifier and a parameter of the resource allocated to the apparatus used as a server side, the second identifier is used to represent order of the resource response, and the second identifier is corresponding to the first identifier.

After receiving the resource request sent by the apparatus used as a server side in FIG. 6, the apparatus used as a client in this embodiment sends the resource response to the apparatus used as a server side, to instruct the apparatus used as a server side to configure a resource, thereby helping avoid a resource waste.

Figure 8:
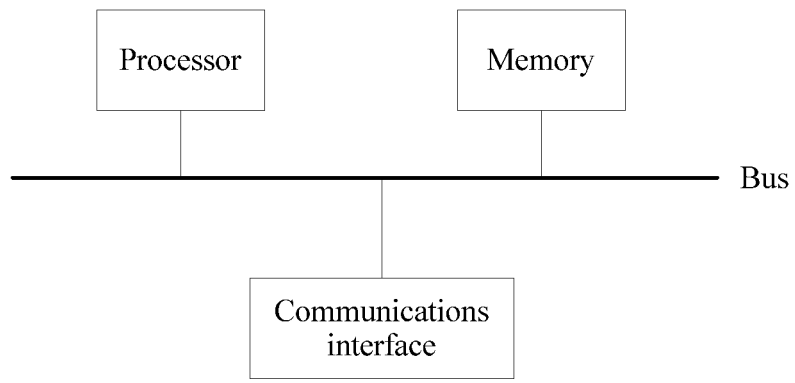
FIG. 8 is a schematic structural diagram of another apparatus used as a server side according to an embodiment of this application.

As shown in FIG. 8, an embodiment of this application further discloses an apparatus used as a server side, including a processor, a memory that is used together with the processor, and a communications interface. The foregoing components communicate with each other by using a communications bus. The apparatus used as a server side and provided in the embodiment corresponding to FIG. 8 may be the apparatus used as a server side and provided in the embodiment corresponding to FIG. 6.

The memory stores a program that implements a resource obtaining function, and the processor may implement, by invoking the program in the memory and the communications interface, content performed by the "server side" in the method shown in FIG. 2, FIG. 3, or FIG. 5.

Figure 9:
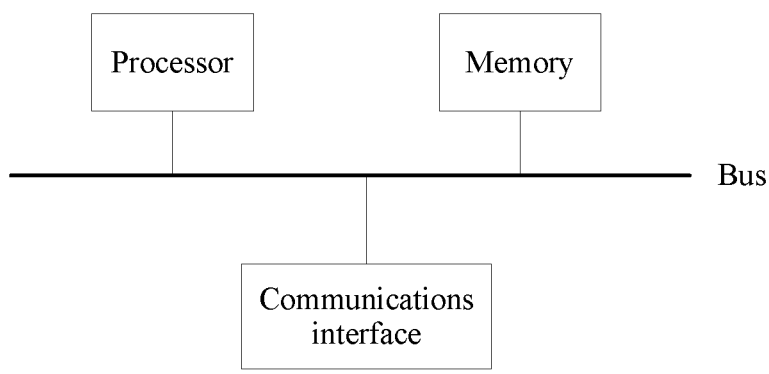
FIG. 9 is a schematic structural diagram of another apparatus used as a client according to an embodiment of this application.

An embodiment of this application further discloses an apparatus used as a client, and a structure is shown in FIG. 9. The memory stores a program that implements a resource obtaining function, and the processor may implement, by invoking the program in the memory and the communications interface, steps performed by the "client" in the method shown in FIG. 2, FIG. 3, or FIG. 5. The apparatus used as a client and provided in the embodiment corresponding to FIG. 9 may be the apparatus used as a client and provided in the embodiment corresponding to FIG. 7.

The resource request and the resource response in embodiments of this application may be described by using a Yet Another Next Generation (YANG) model. A specific description manner is not described herein.

Embodiments in this specification are all described in a progressive manner. For same or similar parts in embodiments, refer to these embodiments. Each embodiment focuses on a difference from other embodiments.

The foregoing general purpose processor may be a microprocessor or the processor may be any conventional processor. The steps of the method disclosed with reference to embodiments of the present invention may be directly performed by a hardware processor, or may be performed by using a combination of hardware and software modules in the processor. When the steps are implemented by using software, code that implements the foregoing functions may be stored in a computer-readable medium, and the computer-readable medium includes a computer storage medium. The storage medium may be any available medium accessible to a computer. The following is used as an example but is not limited: The computer readable medium may be a random access memory (RAM), a read-only memory (ROM), an electrically erasable programmable read-only memory (EEPROM), a compact disc read-only memory (CD-ROM) or another optical disk storage, a disk storage medium or another disk storage, or any other medium that can be used to carry or store program code in a command or data structure form and that can be accessed by a computer. The computer-readable medium may be a compact disc (CD), a laser disc, a digital video disc (DVD), a floppy disk, or a Blu-ray disc.

Finally, it should be noted that the foregoing embodiments are merely examples intended for describing the technical solutions of the present invention other than limiting the present invention. Although the present invention and benefits of the present invention are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present invention.

Additionally, statements made herein characterizing the invention refer to an embodiment of the invention and not necessarily all embodiments.

What is claimed is:

1. A resource obtaining method, comprising:
   determining, by a server side device, whether an address pool used by the server side device meets a condition corresponding to a usage status of addresses in the address pool used by the server side device, wherein the usage status indicates an amount of used or unused addresses of the address pool used by the server side device;
   in response to determining that the address pool used by the server side device meets the condition, generating, by the server side device, a resource request according to the address pool used by the server side device and the condition, wherein the resource request comprises information about an address pool to be requested by the server side device;
   sending, by the server side device, the resource request to a client based on a Network Configuration Protocol (NETCONF) or a Representational State Transfer Configuration Protocol (RESTCONF); and
   receiving, by the server side device, a resource response from the client, wherein the resource response comprises information about an address pool allocated to the server side device;
   wherein the information about the address pool to be requested by the server side device comprises a first action type, a first identifier, and a parameter of the address pool to be requested by the server side device, wherein the first action type represents an operation to be performed on the address pool to be requested by the server side device, and wherein the first identifier represents a sequence of the resource request; and
   wherein the information about the address pool allocated to the server side device comprises a second identifier and a parameter of the address pool allocated to the server side device, wherein the second identifier represents a sequence of the resource response, and wherein the second identifier corresponds to the first identifier.

2. The method according to claim 1, wherein before sending the resource request to the client based on the NETCONF or the RESTCONF, the method further comprises:
based on determining that communication between the server side device and an active client is abnormal, selecting, by the server side device, a standby client as the client according to a correspondence and the active client, wherein the correspondence comprises information about the active client and information about the standby client.

3. The method according to claim 1, wherein the resource request comprises an obtaining message, and the obtaining message comprises the information about the address pool to be requested by the server side device; and
wherein the resource response comprises a response message, the response message comprises the information about the address pool allocated to the server side device, and the response message is responsive to the obtaining message.

4. A resource obtaining method, comprising:
receiving, by a client, a resource request from a server side device based on a Network Configuration Protocol (NETCONF) or a Representational State Transfer Configuration Protocol (RESTCONF), wherein the resource request comprises information about an address pool requested by the server side device, and the resource request is based on a condition corresponding to a usage status of addresses in an address pool used by the server side device, wherein the usage status indicates an amount of used or unused addresses of the address pool used by the server side device;
obtaining, by the client according to the information about the address pool requested by the server side device, information about an address pool allocated to the server side device; and
sending, by the client, a resource response to the server side device, wherein the resource response comprises the information about the address pool allocated to the server side device;
wherein the information about the address pool requested by the server side device comprises a first action type, a first identifier, and a parameter of the address pool requested by the server side device, wherein the first action type represents an operation to be performed on the address pool requested by the server side device, and wherein the first identifier represents a sequence of the resource request; and
wherein the information about the address pool allocated to the server side device comprises a second identifier and a parameter of the address pool allocated to the server side device, wherein the second identifier represents a sequence of the resource response, and wherein the second identifier corresponds to the first identifier.

5. The method according to claim 4, wherein the resource request comprises an obtaining message, and the obtaining message comprises the information about the address pool requested by the server side device; and
wherein the resource response comprises a response message, the response message comprises the information about the address pool allocated to the server side device, and the response message is responsive to the obtaining message.

6. A server side device, comprising:
a processor; and
a non-transitory computer-readable storage medium coupled to the processor and having processor-executable instructions stored thereon;
wherein the processor-executable instructions, when executed by the processor, facilitate:
determining whether an address pool used by the server side device meets a condition corresponding to a usage status of addresses in the address pool used by the server side device, wherein the usage status indicates an amount of used or unused addresses of the address pool used by the server side device;
in response to determining that the address pool used by the server side device meets the condition, generating a resource request according to the address pool used by the server side device and the condition, wherein the resource request comprises information about an address pool to be requested by the server side device;
sending the resource request to a client based on a Network Configuration Protocol (NETCONF) or a Representational State Transfer Configuration Protocol (RESTCONF); and
receiving a resource response from the client, wherein the resource response comprises information about an address pool allocated to the server side device;
wherein the information about the address pool to be requested by the server side device comprises a first action type, a first identifier, and a parameter of the address pool to be requested by the server side device, wherein the first action type represents an operation to be performed on the address pool to be requested by the server side device, and wherein the first identifier represents a sequence of the resource request; and
wherein the information about the address pool allocated to the server side device comprises a second identifier and a parameter of the address pool allocated to the server side device, wherein the second identifier represents a sequence of the resource response, and wherein the second identifier corresponds to the first identifier.

7. The server side device according to claim 6, wherein the processor-executable instructions, when executed by the processor, further facilitate:
before sending the resource request to the client, based on determining that communication between the server side device and an active client is normal, selecting the active client as the client.

8. The server side device according to claim 6, wherein the processor-executable instructions, when executed by the processor, further facilitate:
before sending the resource request to the client, based on determining that communication between the server side device and an active client is abnormal, selecting, according to a correspondence and the active client, a standby client as the client, wherein the correspondence comprises information about the active client and information about the standby client.

9. The server side device according to claim 6, wherein the resource request comprises an obtaining message, and the obtaining message comprises the information about the address pool to be requested by the server side device; and
wherein the resource response comprises a response message, the response message comprises the information about the address pool allocated to the server side device, and the response message is responsive to the obtaining message.

10. A client, comprising:

a processor; and a non-transitory computer-readable storage medium coupled to the processor and having processor-executable instructions stored thereon;

wherein the processor-executable instructions, when executed by the processor, facilitate:

receiving a resource request from a server side device based on a Network Configuration Protocol (NETCONF) or a Representational State Transfer Configuration Protocol (RESTCONF), wherein the resource request comprises information about an address pool requested by the server side device, and the resource request is based on a condition corresponding to a usage status of addresses in an address pool used by the server side device, wherein the usage status indicates an amount of used or unused addresses of the address pool used by the server side device;

obtaining, according to the information about the address pool requested by the server side device, information about an address pool allocated to the server side device; and sending a resource response to the server side device, wherein the resource response comprises the information about the address pool allocated to the server side device;

wherein the information about the address pool requested by the server side device comprises a first action type, a first identifier, and a parameter of the address pool requested by the server side device, wherein the first action type represents an operation to be performed on the address pool requested by the server side device, and wherein the first identifier represents a sequence of the resource request; and wherein the information about the address pool allocated to the server side device comprises a second identifier and a parameter of the address pool allocated to the server side device, wherein the second identifier represents a sequence of the resource response, and wherein the second identifier corresponds to the first identifier.

11. The client according to claim 10, wherein the resource request comprises an obtaining message, and the obtaining message comprises the information about the address pool requested by the server side device; and wherein the resource response comprises a response message, the response message comprises the information about the address pool allocated to the server side device, and the response message is responsive to the obtaining message.

* * * * *